July 19, 1932. D. H. B. REYNOLDS 1,867,891
PIPE JOINT AND THE LIKE
Filed May 22, 1929 2 Sheets-Sheet 1
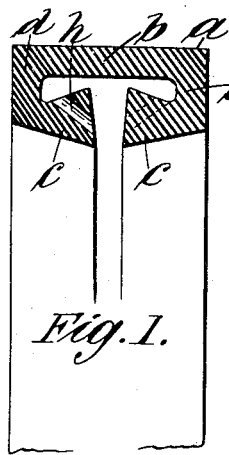
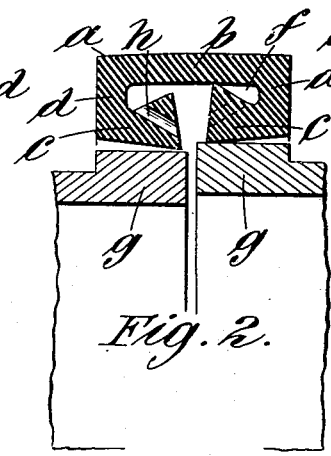
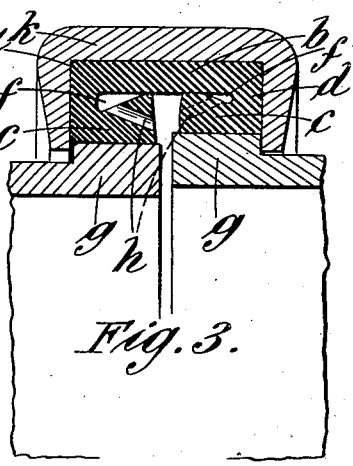
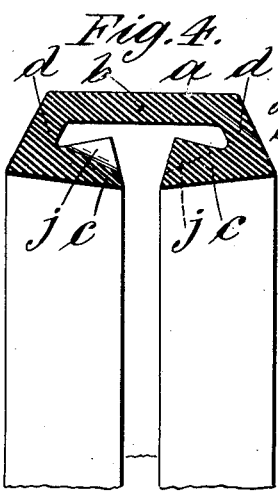
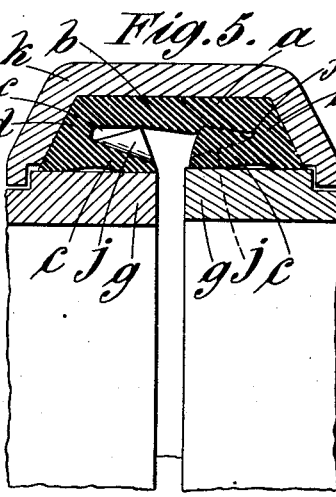
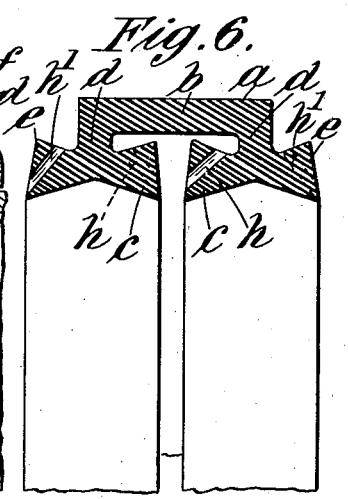
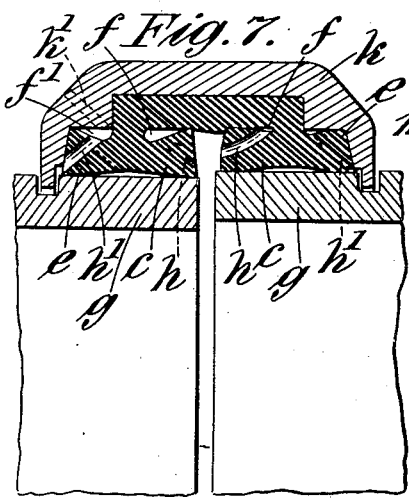
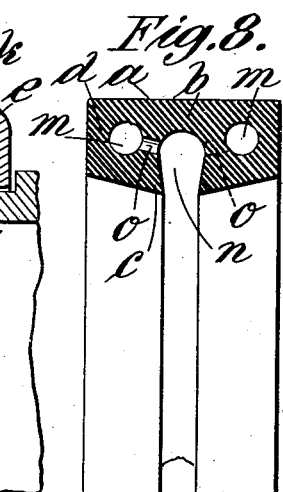
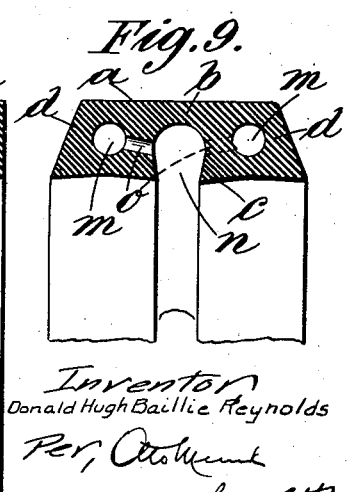
Inventor
Donald Hugh Baillie Reynolds

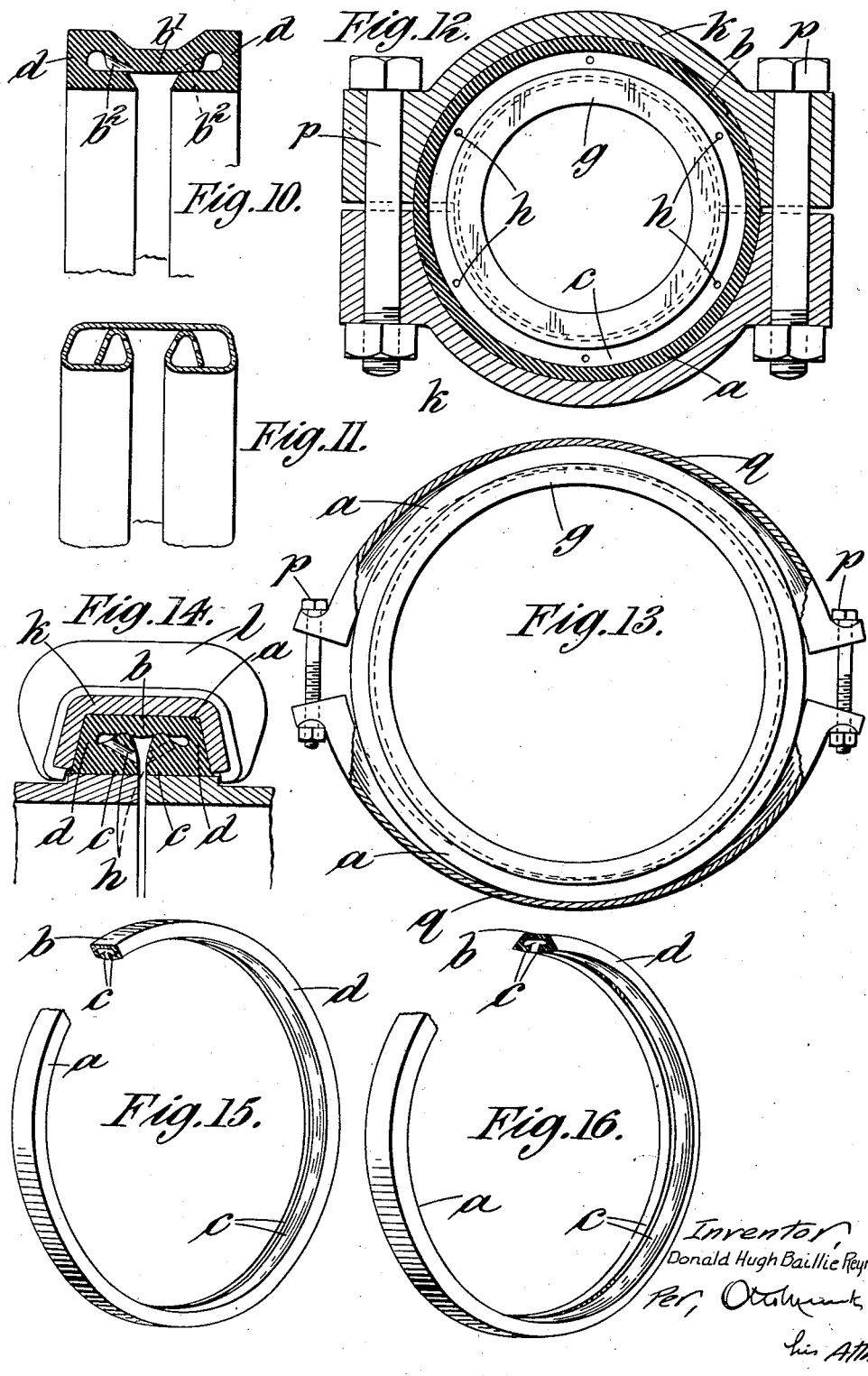

Patented July 19, 1932

1,867,891

UNITED STATES PATENT OFFICE

DONALD HUGH BAILLIE REYNOLDS, OF ST. ALBANS, ENGLAND

PIPE JOINT AND THE LIKE

Application filed May 22, 1929, Serial No. 364,963, and in Great Britain May 26, 1928.

This invention relates to improvements in packings for joints of all kinds in which a flanged element of resilient and elastic material containing fluid under pressure is relied upon to effect sealing.

The invention, in particular, is applicable to pipe joints of the kind in which a flanged element engages with the ends of the pipes to be connected said element in some cases being enclosed within a sheathing which may have means for restraining inadvertent dissociation of the pipes by longitudinal movement.

The invention has for its object the provision of means whereby leakage past the packing is restrained in both directions, said restraints being of equal value if so desired.

When the invention is applied to pipe joints leakage from the pipes to the exterior thereof and leakage from the exterior of the pipes to the interior thereof can be prevented in a more reliable, convenient and economical manner than has been possible hitherto.

In the past it has been proposed to employ deformable jointing rings having flanges or lips, a web and side walls for connecting said flanges or lips to said web; means being provided to press the flanges or lips into contact with the surface of the pipe by hydraulic and by non hydraulic forces so as to prevent leakage; but whilst the outer edges of the flanges may have been firmly held in place, in the case of the inner edges reliance has always hitherto been placed upon the continued resilience of the deformable jointing ring, to press them against the pipe ends with sufficient force to prevent fluid from penetrating beneath them.

The invention consists in the application of pressure by the sheath through the web to the margins of the flanges nearest to the pipe ends to maintain said margins in place.

In the drawings:—

Figure 1 is a cross section through one form of pipe jointing element constructed in accordance with this invention;

Figure 2 illustrates in cross section such a ring as is illustrated in Figure 1 associated with the ends of two pipes which are eccentrically arranged;

Figure 3 is a cross section through a joint similar to that illustrated in Figure 2 after a housing or sheath has been placed in position;

Figure 4 is a cross section through a pipe jointing element, formed in accordance with this invention, adapted to withstand comparatively high external pressures;

Figure 5 is a cross section through a pipe joint, employing the element illustrated in Figure 4, in which the ends of the pipes are eccentrically arranged and the said element is enclosed within a sheath;

Figure 6 is a cross section through a pipe jointing element especially constructed to resist high external pressures;

Figure 7 is a cross section through a pipe joint, employing the element illustrated in Figure 6 which is located upon the ends of two pipes eccentrically arranged and enclosed within the sheath or housing;

Figure 8 is a cross sectional view of a pipe jointing element of modified form;

Figure 9 is a cross sectional view of a pipe jointing element somewhat similar to that illustrated in Figure 8 but arranged to resist higher external pressures than the form illustrated in Figure 8;

Figure 10 is a cross sectional view of a pipe jointing element in which the use of triangular shaped flanges is avoided;

Figure 11 is a cross sectional view of a pipe jointing element formed of a thin sheet of soft metal;

Figure 12 is a front elevation of a two part housing suitable for use with any of the pipe jointing elements illustrated in the preceding figures but obviously such housing may be made in three or more sections;

Figure 13 is a front elevation of especially arranged housing adapted to apply pressure to the pipe jointing element in a graduated manner so as to avoid the introduction of local tensional or compressional stresses in the element due to the application of the sheath or housing;

Figure 14 is a cross sectional view through a pipe joint showing in elevation one of the clamps adapted to engage with grooves in or projections on the pipes to be jointed and prevent longitudinal displacement of one pipe relative to the other pipe;

Figure 15 is a perspective view of a pipe jointing element having the cross section illustrated in Figure 1;

Figure 16 is a perspective view of a pipe jointing element having the cross section illustrated in Figure 4.

The pipe jointing element $a$ illustrated in Figures 1–10 comprises an outer part or web $b$, two flanges $c$ and side walls $dd$ connecting the flanges $cc$ respectively to the web $b$, the surfaces of the flanges $cc$ for contact with the surfaces of the pipes being cylindrical, angularly arranged with respect to one another or suitably shaped relative to the contour of surfaces of the ends $gg$ of the pipes as shown.

As illustrated in Figures 4, 5 and 9, the side walls $d$ have the external surfaces thereof angularly arranged so as to enable the jointing element $a$ to resist greater external pressures than is possible with the form illustrated in Figure 1 and in the form illustrated in Figures 6 and 7 external triangular flanges $e$ are provided on the side walls $dd$ so as to increase still further the resistance to leakage under external pressure.

In each case, the jointing element is made of deformable material, such for instance, as rubber, rubber compounds, rubber substitutes, lead, copper and analogous materials or substances.

The bore of the element $a$ as illustrated in Figures 1, 2, 3, 4 and 8 comprises the frusta of two cones, the maximum diameter of which is substantially equal to the external diameter of the pipes to be connected so that when an element $a$ is installed in position on the ends of pipes a small amount of initial strain is introduced. This initial stress adds to the convenience of assembling the joint but is too small to contribute to its tightness against leakage.

The bases of the triangular flanges $cc$ face one another as illustrated in Figures 1–7 and are separated by such a distance as will prevent any risk of the flanges interfering with one another when distorted in use.

Each of the flanges $c$ as illustrated in Figures 1–9 is provided with either perforations $h$ as illustrated in Figures 1, 2 and 3, or slots $j$, as illustrated in Figures 4 and 5, said perforations $h$ or slots $j$ being arranged so as to establish communication between the space between the bases of the flanges $cc$ and the pockets $f$ which are formed when the jointing element is compressed into jointing position upon the ends $gg$ of the pipes as illustrated in Figures 2, 3, 5 and 7.

In use, an element having a suitable internal diameter is passed over the two ends $g$ of the pipes to be joined and a casing or housing $k$ is externally applied to said element, sufficient force being exerted during the application of the housing $k$ to compress the inner surface of the web $b$ into contact with the internal corner of each of the flanges $c$ and more or less distort the parts into engagement as illustrated in Figures 3 and 5 for example. By this means it will be seen that regardless of axial eccentricity of the pipes the extreme inner periphery of each of the flanges $c$ of the element $a$ is forced firmly into contact with the outer surfaces of the ends $gg$ of the pipes to be joined by a belt of nonhydraulic forces and that a further part of the flanges is forced firmly into contact with said outer surfaces by a belt of hydraulic forces produced by the liquid in the pockets $f$.

The limits of construction involved enable satisfactory jointing of the pipes to be effected within a certain range of axial displacement of said pipes and when such maximum eccentricity is reached then the jointing surface of one flange $c$ at the point of greatest eccentricity will be pressed into contact completely with the surface of the pipe throughout its whole width by nonhydraulic forces whilst the jointing surface of the associated flange $c$ will only engage with the external surface of the associated pipe under the influence of nonhydraulic forces on a belt of comparatively small width.

Although high fluid pressures may cause the sheath to stretch until the forces pressing the flanges against the pipe ends are wholly hydraulic, yet when the fluid pressure is slightly reduced, the consequent contraction of the sheath produces the required pressure upon the edges of the deformable flanges, even though such flanges may have ceased to be resilient.

In this way the tendency of known pipe joints to leak at low pressures, particularly when the jointing element is no longer new, has been entirely overcome.

It will be seen that leakage from the pipes to the exterior thereof is entirely prevented, in the form of element illustrated in Figures 1, 2 and 3 by the hydraulic forces exerted on the flanges $cc$ by the pressure within the pipes and that any leakage from the exterior into the pipes is prevented by the nonhydraulic forces exerted on the element $a$ by the housing $k$.

In the form of jointing element illustrated in Figures 4 and 5 in which the resistance to leakage into the pipes from the exterior is increased by the addition of angular surfaces on the parts $d$ connecting the flanges $c$ to the web $b$ each of the flanges $c$ is distorted by two forces so that said flanges $cc$ not only engage with the external surfaces of the pipes to be joined by means of the margins of the flanges in proximity with one another but also by the margins remote from one another thus producing arched conditions as is illustrated in Figure 5, a belt of hydraulic forces being arranged between two belts of nonhydraulic forces, the widths of the belts of contact between the jointing surfaces of the flanges c and the external surfaces of the ends gg of the pipes being dependent upon the pressure exerted by the housing k which is distributed by the amount of axial eccentricity in the pipes being jointed.

The actual arching of the jointing surfaces of the flanges cc is produced by the deflection towards the centre of the parts d incidental to coaction therewith of the housing k and the angular displacement of the jointing surfaces of the flanges cc when placed in position on the ends gg of the pipes.

To increase still further the resistance of the joint to leakage inwards from external sources the element a may comprise not only a web b, two flanges c, connecting parts dd but also externally arranged flanges ee, said flanges ee having perforations $h^1$ for communicating the external pressure to the pocket $f^1$ formed between the upper surface of the external flange e and inner surface of the housing k. Alternatively to the perforations $h^1$, slots similar to the slots j, already illustrated in Figure 4 for example, may be employed. Alternatively the housing k may be provided with passages $k^1$ adapted to serve the same purpose.

Upon examination of Figure 6 it will be seen that the internal surface of each of the duplex flanges cc is formed as an arch the configuration of which is angular or curved, the whole of the contacting surfaces comprising two arches separated by the space between the flanges c.

When such an element a is disposed upon the ends gg of the pipes as illustrated in Figure 7 any lack of concentricity is easily allowed for within the limits of construction as owing to the fit of the element over the ends of the pipes there is a minimum of initial strain and ample provision is made for the distention and deformation of the material forming the jointing flanges and the communication of both hydraulic and nonhydraulic pressure to said jointing flanges.

As explained hereinbefore in connection with the form illustrated in Figure 3 the flange c and in the case of the form illustrated in Figure 6 also the flange e is forced down into intimate contact with the end g of that pipe the axis of which is disposed above the axis of the other pipe by a broad belt of nonhydraulic pressure, the flanges c and e on the opposite side of the element contacting with the external surface of the pipe g associated therewith by narrow belts of nonhydraulic forces at the margins only as illustrated in Figure 7.

To prevent longitudinal displacement of the pipes relative to one another, said pipes may be provided with raised portions as illustrated in Figures 2, 3 and 5, or grooves as illustrated in Figure 7 with which parts of the housing k engage or alternatively the housing k may be arranged to pass easily over the flanges of the pipes, movement of the pipes g relative to one another being prevented by suitably arranged clamps l as illustrated in Figure 14.

To enable the improved pipe jointing element to be quickly and cheaply produced by modern extrusion methods, the cross sections hereinbefore described may be somewhat modified so as to produce the shape illustrated in Figure 8 for example. In this form, it will be seen that the body of the element a is provided with two tunnels m and a groove n, the groove n communicating with the tunnels mm by means of passages o so as to produce in effect an element comprising a web b, flanges cc and parts dd connecting the flanges cc respectively with the web b and adapted to function in a manner comparable with the forms illustrated in Figures 1 and 2.

The cross section illustrated in Figure 9 is also suitable for extrusion and enables a pipe jointing element adapted to function in a manner comparable with the forms illustrated in Figure 4 to be easily produced by such means.

Extruded elements may conveniently be spliced around pipes which have already been placed in position.

In the alternative form illustrated in Figure 10 the web b is formed with an internally arranged protuberance $b^1$ for contact with the flanges cc, slots $b^2$ being arranged in the protuberance $b^1$ for purposes hereinbefore described.

In some cases when difficulty of installation prevents the use of an endless ring a moulded ring can be cut, arranged in place and rejoined in any convenient or effective manner.

When the use of soft nonmetallic materials such as rubber and the like is objectionable for any reason metal may be employed. In such case copper or the like will be suitable provided that no chemical action is likely to arise. Figure 11 illustrates one form of cross section which will enable the invention to be carried into effect with a metal such as copper, tin alloy or the like.

In actual practice it has been found that although a housing k such as is illustrated in Figure 12 gives moderately satisfactory results, difficulties are introduced in many of the varied conditions which exist owing to the engagement by parts of the housing k with the element a before the bolts pp are fully tightened with the result that upon continued tightening of the bolts pp defective jointing is apt to arise.

To overcome this, the housing k may comprise two flexible parts qq which are non-circular in shape as illustrated in Figures 13 and initially only engage with very small areas of the element a. Upon screwing up the nuts on the bolts pp of such a housing k the parts qq are gradually deformed into circular shape and enwrap the element a until it is fully enclosed within the housing k the pressure of the housing k being then evenly distributed over the whole of the element a.

It will be obvious to those skilled in the art that by the use of this invention many of the disadvantages attendant to pipe joints of known form are overcome. Owing to the absence of any substantial bending moment on the flanges which effect the actual seal the integrity of the joint formed in accordance with this invention is unaffected by change of condition such as, for example, change from dry condition to wet condition or vice versa when a nonmetallic substance is employed and is unaffected by the progress of time inasmuch as no parts are maintained in sealing condition under the influence of circumferential contraction.

Although for the purposes of explanation the constructions illustrated show the improved packing as a deformable jointing element externally arranged relative to the bore of the pipes, when large pipes subject to an external pressure normally in excess of the internal pressure are to be jointed, the jointing elements and housings therefor may be arranged internally of said pipes.

I claim:—

1. A packing for pipe joints of all kinds having in combination a deformable jointing element with two flanges each of which has two free margins, one pair of free margins being pressed into contact with the surfaces of the pipes being jointed by externally applied forces transmitted radially through the web connecting the said flanges and one pair of free margins being pressed into contact with the surfaces of the pipes being jointed by external forces applied thereto directly; and a sheath for enclosing the exterior of said deformable jointing element and producing said forces.

2. A packing for pipe joints of all kinds having in combination a deformable jointing element with two flanges, the free margins of which are pressed into contact with the surfaces of the pipes being jointed by externally applied forces transmitted radially through the web connecting the said flanges, in each of said flanges conduits for the passage of fluid to the space enclosed by a flange and the web from the space between the flanges and a sheath for enclosing the exterior of the deformable jointing element and producing said forces.

3. A packing for pipe joints of all kinds having in combination a deformable jointing element with two flanges, the free margins of which are pressed into contact with the surfaces of the pipes being jointed by externally applied forces transmitted radially through the web connecting the said flanges, two side walls for connecting the flanges to the web and for transmitting externally applied forces to the margins of the flanges remote from the free margins, conduits in each of said flanges for the passage of fluid to the space enclosed by a flange a side wall and the web from the space between the flanges, and a sheath for enclosing the exterior of the deformable jointing element and producing said forces.

4. A packing for pipe joints of all kinds having in combination a deformable jointing element with two flanges interiorly arranged, the free margins of which are pressed into contact with the surfaces of the pipes being jointed by externally applied forces transmitted radially through the web connecting the said flanges, conduits in each of said flanges for the passage of fluid to the space enclosed by a flange and the web from the space between the flanges; two flanges exteriorly arranged, the free margins of which are pressed into contact with the surfaces of the pipes being jointed by external forces applied thereto directly, a sheath for enclosing the exterior of said deformable jointing element and producing said forces and conduits in each of the exteriorly arranged flanges for the passage of fluid from the spaces enclosed by the upper surfaces of said flanges and said sheath.

DONALD H. B. REYNOLDS.